Aug. 15, 1939.   V. YNGVE   2,169,315
SPINNING THERMOPLASTIC MATERIALS
Filed July 26, 1935
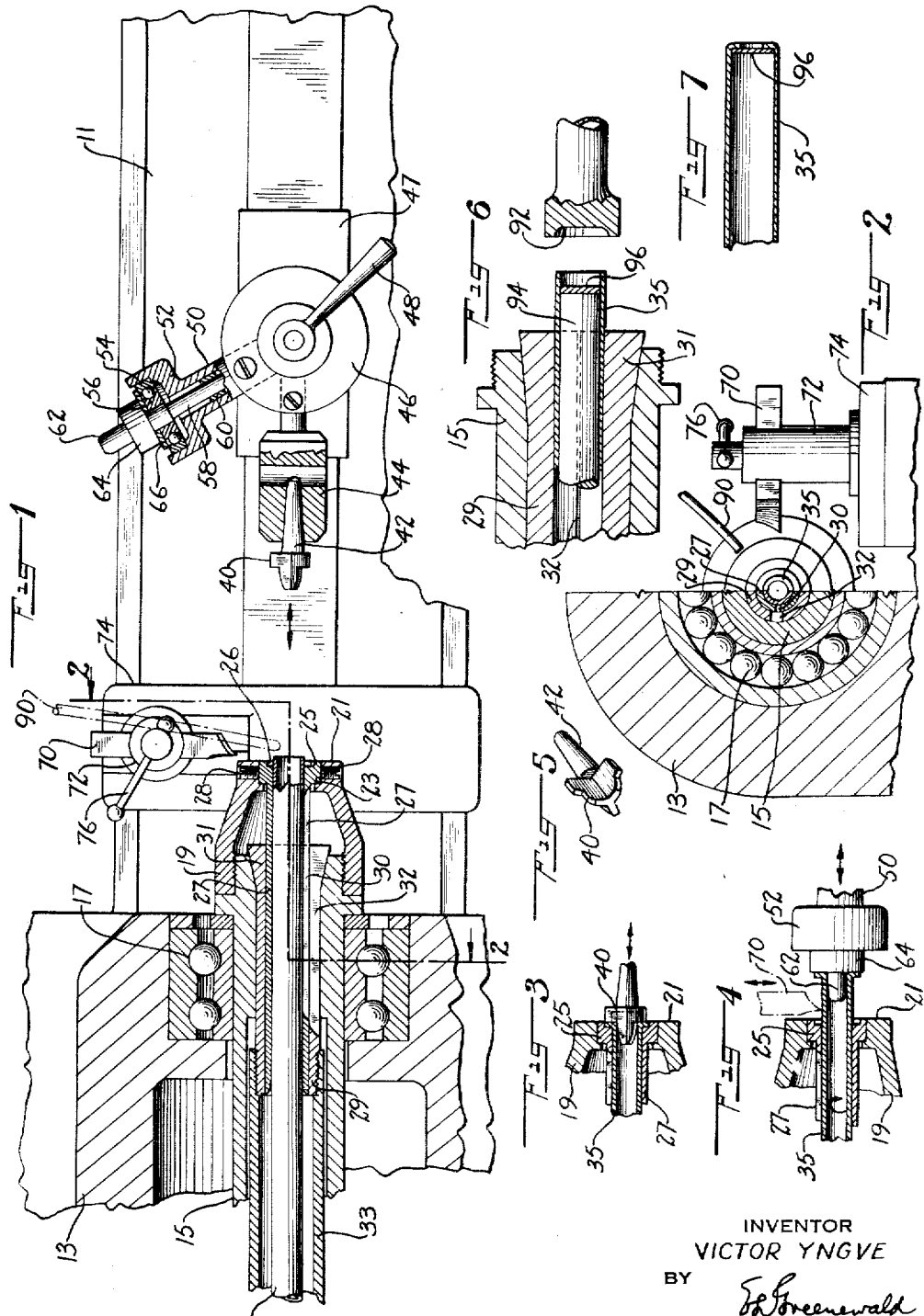
INVENTOR
VICTOR YNGVE
BY
*Greenewald*
ATTORNEY Patented Aug. 15, 1939

2,169,315

UNITED STATES PATENT OFFICE 2,169,315

SPINNING THERMOPLASTIC MATERIALS

Victor Yngve, Lakewood, Ohio, assignor, by mesne assignments, to Union Carbide and Carbon Corporation, a corporation of New York Application July 26, 1935, Serial No. 33,241

14 Claims. (Cl. 18—55)

The present invention relates to the spinning of articles formed from heat-plastic material having shapes, which may be broadly classified as cylinders of revolution; including flanges or headings on rods, concave or convex deformations in plate stock or flanges and closures formed by reshaping of tubular members of heat-plastic material. It has particular utility in the spinning of shoulders and ends on tubular members formed of heat-plastic resins such as those produced by the polymerization of vinyl compounds and mixtures thereof. Among these resins are the resins formed by the conjoint polymerization of a vinyl halide and a vinyl compound of an organic acid.

In the production of a wide variety of articles made from vinyl resins and similar heat-plastic materials, it frequently is desirable to reshape portions of tubular members formed of the said materials in a manner to provide flanges and shoulders thereon,—or to close an end of such members.

Vinyl resins are quite sensitive to heat, which quickly softens them. An excessive temperature often causes discoloration of these resins and loss of some of their valuable physical properties. At temperatures around their softening points, the resins have little physical strength, so that tubing formed thereof may readily be distorted or ruptured by extraneous forces. For this reason, in practice, articles of vinyl resins usually are produced by some modification of a molding or an extrusion technique,—the molded or extruded articles being thereafter quickly chilled to solidify and strengthen them. While extrusion processes have certain advantages over molding operations in the continuous production of rod and tubular shapes, the former are not adapted for use where the articles to be formed have certain irregular surface conformations. In the molding of articles made from thermoplastic materials into shapes that cannot be produced by extrusion, expensive molds and long forming cycles are required. In many cases these may not be economically justified by the quantities involved. In that event the production of the desired shape by a secondary forming operation such as spinning a section of an extruded rod or tubular section, offers an advantage from an economic standpoint.

The present invention is based, in important part, upon the discovery that a spinning technique successfully can be employed for shaping articles made of thermoplastic materials such as vinyl resins, without distortion of the articles or injury to the thermoplastic material, by a process wherein the heating of the material is limited both as to the small area thereof involved and the degree of heat developed at the heated area.

Among the more important objects of the invention are the following: To reshape or modify tubular forms of thermoplastic materials such as vinyl resins by means of a spinning operation; to provide in novel manner for the formation of shoulders and closed ends on tubular articles, while preventing loss of the desirable physical properties of the materials thereof; and to provide for shaping articles made of thermoplastic materials, while the main body thereof is in the cold or unheated state.

According to the invention a tubular article of thermoplastic material to be reshaped is rotated rapidly upon its longitudinal axis, while concurrently therewith a regulated pressure is exerted upon that zone of the article at which a change in form is desired. The pressure preferably is applied steadily by a force moving longitudinally of the rotating tubing, and of such magnitude as to develop enough heat of friction at the said zone to soften the material there. The accumulation in the said zone of heat in quantity sufficient to cause uncontrolled distortion of the article is prevented; and the force is directed to produce lateral reshaping of the article at the said zone to a selected form.

In the practice of the invention, the tubing of thermoplastic material to be shaped may be mounted on a mandrel or in a collet in such manner that the portion to be reshaped extends beyond the end thereof. This assembly preferably is mounted in a lathe or the equivalent. Then, with the supported tubing rapidly revolving, a forming tool at the proper temperature is pressed yieldingly against an end of the revolving tubing, causing the latter to soften at the point of contact and assume the desired shape. A jet of cold air or other cooling medium is directed upon the forming or spinning tool during the operation for removing any excess of the heat of friction generated in the shaping operation.

Either the tubing of thermoplastic material or the spinning tool, and preferably the former, is rapidly revolved as the said tool is brought into pressing contact with the tubing. The pressure of the tool generates heat locally which softens the tubing at the zone of contact and causes it to be reshaped in accordance with the shape of the backing surface. The amount and direction of application of the pressure is regulated carefully to limit the heat generated and prevent the softened resin from becoming torn, darkened, or destroyed.

The vinyl resin or other material used may have incorporated therein the usual fillers, dyes, softeners, and other well-known compounding ingredients. Where softeners are employed, they are generally used sparingly to avoid the development of undue tackiness under the spinning tool.

The temperature at which deformation of the material occurs varies with the particular thermoplastic material used, and with the amount of fillers present. With unfilled "Vinylite", this temperature may range around 100°–110° C. In general it is desirable to utilize a material which has as high and sharp a softening point as possible.

In one commercial adaptation of the invention, a flange or shoulder is spun upon tubing of a white resinous composition containing a resin formed by the conjoint polymerization of a mixture of about 85% vinyl chloride and about 15% vinyl acetate, and containing in addition to the resin

| | Percent |
|---|---|
| Lead stearate | 1.50 |
| Butyl stearate | 1.00 |
| Basic lead carbonate | .75 |
| Clear mineral oil | 2.00 |

The said tubing has an outside diameter of .531 inch, and a wall thickness of .025 inch. In the formation from this tubing of short nipples having an external flange at one end, a long length of the tubing is fed through a hollow split collet mounted in a lathe. The portion of the tubing which is to be spun into a shoulder is arranged to project outwards beyond the collet; and the assembly is rotated. In the present instance a speed of 1800 R. P. M. has been utilized effectively.

The spinning or shaping tool is mounted coaxially with the rotating tubing, and is arranged for regulated movement toward and away from the projecting end of the tubing. This movement, and the pressure employed in forcing the said tool against the projecting end of the tubing, may be imparted mechanically or manually. The spinning tool has such a contour that, as it presses against the tubing, the latter is folded back upon itself at the warm zone produced by the tool. If desired, it may be pressed against the supporting and shaping surface of the collet, though this is not necessary. After the desired reshaping is attained, the tool is retracted; and the tubing then is released, and is moved through the collet a distance corresponding to the length of flanged tubing desired. A cutting tool or rotary knife then cuts off the piece of flanged tubing; the said tool also may chamfer the cut margins if desired. The cycle of operations then is repeated. During the entire operation a jet of cold air impinges upon the tubing at and adjacent to the point at which the tools contact with the latter. The complete cycle of operations described above requires about five seconds.

In instances where the thermoplastic material used has a very high softening point, or where relatively thin sections under deformation are involved, it may be desirable at times to apply heat to either the tubing or the forming tool from an external source during the reshaping operation.

In practicing the invention for closing an end of tubing of thermoplastic material, the forming tool has a concave working face which, during use, pressingly engages the end of the tubing projecting from the collet. The end of the tubing progressively is softened and turned inwardly, the heat of friction being controlled by directing a current of cold air or other fluid upon the zone undergoing deformation.

It is preferable, in forming closed ends in tubing of thermoplastic material of low softening points, such as vinyl resins, that the total area of the tubing being reshaped by the forming tool be relatively small, to avoid undue local accumulation of heat in the operation. Therefore, a bottom closure disc, preferably of the same thermoplastic material as the tubing, and of diameter slightly less than the diameter of the tubing, may be placed within the latter and in contact with a rotatable solid mandrel upon which the tubing is mounted. The spinning tool presses the tubing against this mandrel. The projecting part of the tubing thus is bent inwardly and is bonded to the bottom disc, under the effect of the heat and pressure generated by contact of the shaping tool therewith.

The exact shape, contour and finish of the shaping tool will vary in accordance with the character of the material being processed and with the extent and character of the reshaping of the tubing. A chromium-plated surface or an equivalent polished surface is highly desirable for all parts coming in contact with the softened material.

In the accompanying drawing, which illustrates apparatus adapted for the practice of the invention;

Fig. 1 is a plan view of a portion of a lathe and associated parts, portions being broken away, and others being shown in section;

Fig. 2 is a fragmentary vertical section taken along the line 2—2 of Fig. 1, looking in the direction of the arrows;

Fig. 3 is a longitudinal section through part of the inner collet and tubing, showing the forming tool in operative position;

Fig. 4 is a longitudinal section through a portion of the inner collet and tubing during a cutting operation;

Fig. 5 is a perspective view of a forming tool;

Fig. 6 is a longitudinal section through a portion of tubing and support therefor, showing another type of shaping tool, parts being broken away; and Fig. 7 is a longitudinal section through the finished closed-end tubing.

Referring now to the drawing, the numeral 11 designates the bed of a turret lathe of well known type. Mounted upon the bed of the lathe is a headstock 13 into which is mounted a rotatable spindle 15. The bearings for this spindle may be plain babbitt on ball bearings 17. (Only one set of bearings is shown.) The outer and inner ball races are secured in place by retaining rings or in other suitable manner. Threadedly secured to the headstock spindle 15 is a collet adapter 19 having a free or forward end of reduced cross-section, and the forward face 21 provided with a central aperture through which the tubing to be reformed projects during the shaping operation. A groove 23 is provided in the forward face adjacent the central aperture into which extends the flanged end 25 of a hollow split tubular inner collet 27, which flanged end 25 has a central groove 26 in its forward face. The collet 27 is adapted to clamp the tubing in position while a flange is being formed thereon, and again while the finished piece is being severed from the tubing. Set screws 28 lock the inner collet 27 to the adapter 19.

The inner collet 27 is pressingly engaged by the inner walls of a split tubular actuating collet 29, the latter of which has a beveled or wedge-shaped shoulder 31 at the forward end adjacent the collet adapter, and has its other end threadedly secured to a longitudinally-movable actuating member or draw-in tube 33. The latter, when moved in a direction away from the forward face of the collet adapter 19, actuates the collets and causes the collet 27 to clamp the tubing 35.

The inner collet 27 and the actuating collet 29 respectively are split longitudinally at the portions 30, 32, located rearwardly of the flanged end 25 of the collet 27. The construction is such that normally the adjacent margins of the collet side walls are spaced apart a slight distance, but may be forced together under suitable pressure. When the member 33 is moved away from the forward face of the collet adapter 19 it moves the actuating collet 29 correspondingly, thus collapsing the inner collet 27 into engagement with the tubing 35. The rotating headstock spindle 15 then imparts rotation to the tubing. When the member 33 is moved to the right (Fig. 1) the inner collet is released by the actuating collet, and the tubing then is released, and may be moved longitudinally, either manually or mechanically, in preparation for a cutting operation, or for the purpose of removing the tubing or adjusting its position.

For shaping the end of the tubing there is provided a tool 40 having a shaping surface of suitable design, and having a tapered shank 42 with a tang on its end and adapted to be secured in a supporting member 44 by a driving fit in well-known manner. The tool 40 may be held in a chuck. The member 44 is mounted upon a revolving turret 46 carried by a member 47 which is supported upon the lathe bed 11 for sliding movement longitudinally thereof.

In the form shown in Fig. 5, the forming tool has three spinning lands, each having the midportion of its working face convex, and having the outer portion thereof perpendicular to the path of movement of the tool during use. Other tool shapes obviously may be substituted for that shown.

Also mounted upon the turret 46 is a ball-bearing turret stop 50, comprising a ball-bearing holder 52 suitably secured to the turret. The said holder has a central aperture, the portion of which within the large end of the holder is enlarged and has secured therein the outer member 54 of a ball race. The inner member 56 of the ball race is secured to a midportion of a shaft 58 which is freely rotatable upon the said bearing and upon a pilot bearing 60, the latter of which assists to preserve the alignment of the shaft. The bearing 60 is secured within the holder by a press fit. Formed on the free end of the shaft 58 is a stop member 62 slightly smaller in diameter than the internal diameter of the tubing 35 and adapted to extend within the tubing upon forward movement of the latter and to permit gauging the length of tubing to be cut off following each shaping operation. The member 62 has beveled margins, and has a shouldered portion 64 against which the flanged margin of the tubing rests during the cutting operation. When a rotary cutter is used, the stop 62 has a length greater than the finished section of tubing to be severed, and acts as a support against which the cutter acts. A retaining disc 66 for the ball race is secured to the shaft 58.

For cutting off selected lengths of tubing following the shaping operation there is provided a cutting tool 70 of well-known type, mounted for longitudinal sliding movement in a groove in a standard 72 which is supported upon a carriage 74 for movement transversely of the lathe bed. This cutting tool may be a rotating knife which bears against the member to be cut. The use of this type of knife serves to prevent losses of stock by formation of shavings such as occurs in the use of a stationary cutting tool. The carriage is mounted on the lathe bed for movement longitudinally of the latter, in the usual manner. The cutting tool is lockable upon the standard 72 in any selected position by suitable means, actuated by the clamping lever 76. A conventional locking device clamps the carriage 74 to the lathe bed in selected position from below.

A chamfer tool (not shown) may be used to bevel the cut margins of the tubing, where such is desired.

For maintaining a suitable temperature at the shaping and cutting zone, and for preventing injury to or destruction of the tubing, there is provided one or more tubes 90 adapted to direct a cooling fluid such as air or water upon the tubing at and adjacent the shaping and cutting zone.

In the operation of the mechanism shown in Figs. 1 to 5, a length of tubing is fed through the split collet 27 until the portion of the tubing to be spun into a shoulder projects beyond the collet the desired amount. It is then secured in position by movement of member 33. By suitable means (not shown) the entire collet assembly and tubing is rotated. The shaping tool now is disposed axially of the rotating tubing by manipulation of the member 48 and turret 46; and this assembly is moved toward the projecting end of the tubing. The shaping tool enters the tubing and is forced against the wall of the latter under controlled pressure, as by manual operation of the member 47. The heat of friction developed at the zone of contact of the shaping tool and the rotating tubing warms and slightly softens the tubing at this zone; and the warmed tubing folds or turns back against the supporting surface of the groove 26 in the collet.

When the desired reshaping is complete, the tool is held momentarily in place, and is then moved back by retraction of the carriage 41. The turret thereafter is rotated to bring the stop member 62 into axial alignment with the reshaped end of the tubing. The member 33 is then moved to the right (Fig. 1); and the released tubing is moved outwardly beyond the collet until its forward end embraces the stop member 62 and abuts the shoulder 64 thereon (See Fig. 4.) The collet is closed and the cutting tool 70 is then moved into contact with the rotating tubing and cuts through it. The member 62 rotates with the tubing until the latter is cut free by the cut-off tool. The cut-off part is removed from the member 62 upon rotating the turret, as by passing under an air jet; and the series of operations then are repeated.

One or more jets of cool air or other cooling fluid are directed upon the shaping and cutting tools, and upon the zone of the tubing being reshaped and cut, throughout the series of operations. The cooling jets serve the dual purpose of cooling the tubing and members adjacent thereto, and of blowing away from the area being reshaped and cut any shavings of the softened material which otherwise might adhere to the tubing and injure or destroy it during the operation.

In the practice of the invention for closing the ends of tubing, the apparatus may be similar to that described above, excepting that a shaping tool having a generally concave working face such as that shown at 92 in Fig. 6 is utilized; and the tubing 35 is secured upon a solid mandrel 94 and is rotated therewith. The shaping tool presses the tubing against this mandrel during the shaping operation. In instances where a closure disc 96 is employed, as shown in Fig. 6, the disc,—generally of the same material as the tubing,—is inserted within the tubing and against the end of the mandrel, and the ends of the tubing then are turned inwardly in the manner described. Fig. 7 shows tubing which has an end closed in this manner. The turned-in margins of the tubing may be intimately bonded to the disc by regulation of the heat developed at the shaping zone during the operation,—or by regulating the kind and amount of softeners in the thermoplastic material from which the tubing is made,—or by the direct application to the zone being reshaped during the reshaping operation of a softening agent which will cause incipient tackiness and adhesion of the contact surfaces.

I claim:

1. The method for the production of shaped articles, which comprises rapidly rotating upon its longitudinal axis, a solid body of heat-sensitive thermoplastic material having the general shape of a cylinder of revolution, softening and reshaping an end margin of the said body by the heat of friction developed by a member pressed against an end of said body, the said body being moved relative to the said member, and preventing accumulation of excessive heat in the portion of the body thus softened during the application of the said force.

2. The method for the production of tubular articles, which comprises rapidly rotating a solid tubular body of heat-plastic resin upon its longitudinal axis, softening and reshaping an end margin of the tubular body by the heat of friction produced by a member pressed against an end of said body, the said member and said body being movable relative to each other, and applying a cooling agency to the portion of the body thus softened during the application of the said force.

3. The method for the production of tubular articles, which comprises rapidly rotating a solid tubular body of a heat-plastic resin upon its longitudinal axis, softening and reshaping an end margin of the tubular body at a limited annular zone of the latter, severing from the tubular body at a cutting zone a selected portion thereof having the reshaped end margin, and maintaining during the respective softening, reshaping and severing steps a flowing stream of a cooling fluid about the respective portions of the body being softened, reshaped and severed.

4. The method of shaping tubular articles formed of a solid thermoplastic heat-sensitive material, which comprises treating an annular zone of such tubular article selectively to soften the material at the said zone, and subjecting the article at that zone to a steady reshaping pressure by means of a force directed axially of the article, while limiting the extent of softening of the material by local application of a cooling agent thereby preventing uncontrolled distortion of the article.

5. The method of shaping articles of solid thermoplastic heat-sensitive resinous composition, which comprises rapidly rotating, upon its longitudinal axis, such article having the general shape of a cylinder of revolution, concurrently developing within a limited annular zone of said article a regulated amount of heat of friction sufficient to soften the thermoplastic composition at the said zone only, while continuously directing a stream of cooling fluid upon the said zone, thereby preventing the accumulation of sufficient heat in the latter to cause uncontrolled distortion of the article; and concurrently shaping the article at the said zone.

6. The method of shaping a tubular article of solid thermoplastic resinous material, which comprises rapidly rotating such a tubular article upon its longitudinal axis, concurrently developing within a narrow annular zone of said article a regulated amount of heat of friction sufficient to soften the thermoplastic resinous material at the heated zone only, while preventing the accumulation in the said zone of sufficient heat to cause uncontrolled distortion of the article, concurrently shaping the article at the said zone, thereafter during rotation of the shaped article severing a portion thereof at a cutting zone, and directing a stream of a cooling fluid upon the article respectively at the said heated zone and at the said cutting zone at least during the corresponding shaping and severing steps.

7. The method of shaping a solid heat-decomposable tubular article formed of a solid heat-decomposable thermoplastic material, which comprises softening the said material in a narrow annular zone in the tubular article, reshaping an end margin of such article by a force axially applied against an end of the article while the latter is being subjected to a spinning operation upon its longitudinal axis, and directing a blast of a cooling fluid upon the said narrow annular zone during the said reshaping step.

8. The method of closing the end of a tubular article of solid heat-sensitive thermoplastic material, which comprises rapidly rotating the said article while applying to an end thereof a regulated force acting locally to heat and soften the said material only at the narrow annular zone of application of the force and to crimp the margin of the article at the said end to close the end, and shifting the zone of application of the said force upon the article in a direction axially of the latter, while applying a cooling fluid to the said zone, thereby preventing undue softening of the said material.

9. The method of closing an end of tubing of heat-sensitive thermoplastic material, which comprises applying a softening agent to the tubing adjacent an end thereof, rapidly revolving the said tubing while applying to the said end a regulated force acting locally to heat and soften the said material at the zone of application of the force and to crimp the margin of the tube to close the end, and shifting the zone of application of the said force upon the tube in a direction axially of the latter while applying a cooling fluid to the said zone, thereby preventing undue softening of the said material.

10. The method of forming a closed end in a tubular article of heat-sensitive thermoplastic material during spinning of the article, which comprises developing heat of friction in a narrow annular zone in the said article adjacent an end thereof in amount sufficient to soften the material at this heated zone and permit reshaping of the article, the said heat being developed in regulated amount by a spinning operation, and concurrently reshaping the article at the said zone, crimping inwardly the softened end margins of the article at the said heated zone, while applying a cooling fluid to the said zone, thereby preventing uncontrolled softening of the said material at and adjacent the said zone.

11. The method of forming a closed end in a tubular article of solid thermoplastic organic material, which comprises inserting an end blank of the said material within an end zone of the said article, thereafter, while rapidly rotating the tubular article on its longitudinal axis, developing heat of friction in the said end zone in amount sufficient to soften the material at the said zone only but insufficient to decompose the said material, while applying a reshaping member pressing against an end of said article and movable relative to the latter, the said member acting to crimp inwardly the softened end margins of the article and press the said margins upon the said end blank, thereby securely bonding the said blank and the crimped margins of the article, and preventing the accumulation in the article during the said steps of sufficient heat to cause uncontrolled deformation of the latter.

12. The method of reshaping a shaped body of a thermoplastic heat-sensitive resinous composition having the general shape of a cylinder of revolution, which comprises developing heat of friction within a selected narrow zone in a solid body of the said composition while spinning said body on its longitudinal axis by means of a member pressing against an end of said body in an axial direction, there being relative movement between said body and said member, regulating the amount of such heat of friction thereby producing a local selected softening of the composition at the said zone, shaping the body at the said zone while thus softened, and removing heat from the said zone during the heat-developing step.

13. The method of reshaping a shaped body of a vinyl resin having the general shape of a cylinder of revolution, which comprises developing heat of friction within a selected narrow annular zone in a solid body of the said resin rapidly revolving on its longitudinal axis by means of a member pressing against an end of said body in an axial direction, there being relative movement between said body and said member, regulating the amount of such heat thereby producing a selected softening of the resin at the said zone, shaping only the portion of the body thus softened, and continuously removing heat from the said zone during the heat-developing step.

14. The method of shaping a tubular article formed of a solid thermoplastic material having a low softening point, which comprises treating an annular zone of such tubular article with a softening agent, and subjecting the article at the said zone to a steady reshaping pressure in the presence of a regulated amount of heat of friction produced by a member pressed against an end of the article while the latter is being rapidly rotated on its longitudinal axis relative to said member, and while preventing undue softening of the said material.

VICTOR YNGVE.

CERTIFICATE OF CORRECTION.

Patent No. 2,169,315.  August 15, 1939.

VICTOR YNGVE.

It is hereby certified that error appears in the printed specification of the above numbered patent requiring correction as follows: Page 4, second column, lines 34 and 35, claim 7, strike out the words "solid heat-decomposable; and that the said Letters Patent should be read with this correction therein that the same may conform to the record of the case in the Patent Office.

Signed and sealed this 19th day of September, A. D. 1939.

(Seal)

Henry Van Arsdale,
Acting Commissioner of Patents.

an end thereof in amount sufficient to soften the material at this heated zone and permit reshaping of the article, the said heat being developed in regulated amount by a spinning operation, and concurrently reshaping the article at the said zone, crimping inwardly the softened end margins of the article at the said heated zone, while applying a cooling fluid to the said zone, thereby preventing uncontrolled softening of the said material at and adjacent the said zone.

11. The method of forming a closed end in a tubular article of solid thermoplastic organic material, which comprises inserting an end blank of the said material within an end zone of the said article, thereafter, while rapidly rotating the tubular article on its longitudinal axis, developing heat of friction in the said end zone in amount sufficient to soften the material at the said zone only but insufficient to decompose the said material, while applying a reshaping member pressing against an end of said article and movable relative to the latter, the said member acting to crimp inwardly the softened end margins of the article and press the said margins upon the said end blank, thereby securely bonding the said blank and the crimped margins of the article, and preventing the accumulation in the article during the said steps of sufficient heat to cause uncontrolled deformation of the latter.

12. The method of reshaping a shaped body of a thermoplastic heat-sensitive resinous composition having the general shape of a cylinder of revolution, which comprises developing heat of friction within a selected narrow zone in a solid body of the said composition while spinning said body on its longitudinal axis by means of a member pressing against an end of said body in an axial direction, there being relative movement between said body and said member, regulating the amount of such heat of friction thereby producing a local selected softening of the composition at the said zone, shaping the body at the said zone while thus softened, and removing heat from the said zone during the heat-developing step.

13. The method of reshaping a shaped body of a vinyl resin having the general shape of a cylinder of revolution, which comprises developing heat of friction within a selected narrow annular zone in a solid body of the said resin rapidly revolving on its longitudinal axis by means of a member pressing against an end of said body in an axial direction, there being relative movement between said body and said member, regulating the amount of such heat thereby producing a selected softening of the resin at the said zone, shaping only the portion of the body thus softened, and continuously removing heat from the said zone during the heat-developing step.

14. The method of shaping a tubular article formed of a solid thermoplastic material having a low softening point, which comprises treating an annular zone of such tubular article with a softening agent, and subjecting the article at the said zone to a steady reshaping pressure in the presence of a regulated amount of heat of friction produced by a member pressed against an end of the article while the latter is being rapidly rotated on its longitudinal axis relative to said member, and while preventing undue softening of the said material.

VICTOR YNGVE.

CERTIFICATE OF CORRECTION.

Patent No. 2,169,315.                          August 15, 1939.

VICTOR YNGVE.

It is hereby certified that error appears in the printed specification of the above numbered patent requiring correction as follows: Page 4, second column, lines 34 and 35, claim 7, strike out the words "solid heat-decomposable; and that the said Letters Patent should be read with this correction therein that the same may conform to the record of the case in the Patent Office.

Signed and sealed this 19th day of September, A. D. 1939.

Henry Van Arsdale, (Seal)                               Acting Commissioner of Patents.